United States Patent
Laumann et al.

[11] Patent Number: 5,867,972
[45] Date of Patent: Feb. 9, 1999

[54] AGRICULTURAL MACHINE

[75] Inventors: Bernhard Laumann, Sassenberg 2; Bernhard Schäfers, Marsberg 17, both of Germany

[73] Assignee: Claas KGaA, Harsewinkel, Germany

[21] Appl. No.: 912,556

[22] Filed: Aug. 18, 1997

[30] Foreign Application Priority Data

Aug. 16, 1996 [DE] Germany .......................... 19632895.0

[51] Int. Cl.$^6$ .......................... H01D 43/08; H01D 45/02
[52] U.S. Cl. .......................... 56/126; 56/221; 56/DIG. 9
[58] Field of Search .......................... 56/1, 2, 14.4, 14.6, 56/15.6, 116, 126, DIG. 9, DIG. 15, 364, 228, 218, 221, 222

[56] References Cited

U.S. PATENT DOCUMENTS

| 3,324,635 | 6/1967 | Ashton et al. .................. 56/DIG. 9 X |
| 3,431,711 | 3/1969 | Claas .............................. 56/DIG. 9 X |
| 3,638,407 | 2/1972 | Togami ........................... 56/DIG. 9 X |
| 3,975,889 | 8/1976 | Kerber et al. ................................. 56/2 |
| 4,444,000 | 4/1984 | Enzmann et al. ............... 56/DIG. 9 X |
| 5,261,216 | 11/1993 | Schumacher, II et al. ........... 56/221 X |
| 5,535,578 | 7/1996 | Honey ................................... 56/15.6 X |

FOREIGN PATENT DOCUMENTS

| 0 457 124 A1 | 11/1991 | European Pat. Off. . |
| 1 482 842 | 10/1969 | Germany . |
| 40 21 030 C2 | 10/1994 | Germany . |

Primary Examiner—Thomas B. Will
Assistant Examiner—Robert Pezzuto
Attorney, Agent, or Firm—Michael J. Striker

[57] ABSTRACT

A harvester thresher has a cutting mechanism, a reel having reel supporting arms, an exchangeable attachment which is releasably connected with the cutting mechanism, sliding shoes in which the reel is rotatably supported and which are synchronously forwardly and rearwardly displaceable on the reel supporting arms for adjusting the reel relative to the cutting mechanism, shaped parts arranged on the cutting mechanism and the attachment for moving the cutting mechanism and the attachment to a proper position, driving and pulling elements arranged on the sliding shoes and on the attachment and connectable with one another at a predetermined distance between the cutting mechanism and the attachment so that by moving back the reel the attachment is movable to an end position.

6 Claims, 1 Drawing Sheet

AGRICULTURAL MACHINE

BACKGROUND OF THE INVENTION

The present invention generally relates to an agricultural machine.

More particularly, it relates to an agricultural machine which has a cutting mechanism with side walls, a reel, and an exchangeable attachment which is releasably connected with the cutting mechanism, and also with shaped parts which are arranged on the cutting mechanism and on the attachment to assemble them in proper position, wherein the reel is rotatably supported in sliding shoes which in turn are synchronously displaceable forwardly and rearwardly relative to the cutting mechanism on lateral reel supporting arms for adjusting the reel.

The cutting mechanism of the harvester thresher of the above mentioned general type includes substantially a mowing bar, a mowing table, the side walls as well as a drawing-in screw which is rotatingly drivingly supported in a cutting mechanism trough for supplying the harvested product to a subsequent inclined conveyor. Such a cutting mechanism is designed for harvesting all known grain sorts. The reel supporting arms are vertically adjustable about a joint horizontal axis by a hydraulic cylinder-piston unit. For adjusting the reel relative to the mowing bar, the sliding shoes are also mowed by a controlled hydraulic cylinder-piston unit. The harvester thresher described hereinabove must however harvest not only the generally known grain sorts, but also special field fruits, such as for example rape, sunflower, soybeans, castor beans, etc. With the grain cutting mechanism the harvesting of these fruits is not possible or can be performed only with a significant loss.

Special attachments have been developed which must be coupled to the cutting mechanism when needed. In order to displace the attachment in a proper position to the cutting mechanism, shaped parts are fixed on the side walls of the cutting mechanism and the attachment and designed as auxiliary means or centering means. For coupling the attachment to the cutting mechanism, the attachment is moved from the harvester thresher. The shaped parts are then joined substantially in one another. In order to move the attachment into the end position for coupling, it is however necessary to move and orient the attachment by one or several people with auxiliary means such as for example lever bars. The coupling of the attachment is time consuming and also quite complicated, especially when the required auxiliary people are not available.

SUMMARY OF THE INVENTION

Accordingly, it is an object of present invention to provide a harvesting thresher of the above mentioned general type, which avoids the disadvantages of the prior art.

More particularly, it is an object of present invention to provide a harvester thresher which is formed structurally in a simple manner so that the coupling of the attachment to the cutting mechanism can be performed in a short time by a driver of the harvester thresher without additional help.

In keeping with these objects and with others which will become apparent hereinafter, different movement possibilities of the reel device for changing the vertical height position and/or changing the horizontal position of the reel on the supporting arms for the position contour of the attachment to the harvester thresher are utilized. First of all, for this purpose, on the sliding shoes and in a proper position on the attachment, driving and pulling elements are arranged which can be coupled with one another with a predetermined distance between the cutting mechanism and the attachment, so that by moving back and changing the horizontal position of the reel, the attachment is moved to the end position. On the other hand, by the vertical turning of the reel supporting arm, the same purpose can be achieved. In particular, the reel supporting arms are connected through a pulling rod with the attachment whose pulling directions preferably are optimally oriented through fixed points (deviating rollers) on the mowing table.

With the driving and pulling elements, a drawing-in assistance for the driver of the harvester is provided. For this purpose, the available displacability of the sliding shoes or the vertical adjustability of the reel supporting arms by means of the hydraulic cylinder-piston unit is used, in order to pull the attachment to the end position in which it can be connected with the cutting mechanism. The structural expense is therefore extremely small, since only the corresponding mechanical components are needed. The driver drives the harvester thresher so far to the attachment until the driving and pulling elements are coupled with one another. By moving back the reel opposite to the forward traveling direction of the harvester thresher or by lifting the reel arms, the attachment is moved so far until the shaped parts which provide a form-locking connection engage in one another. Then the attachment can be finally fixedly connected with the cutting mechanism. This is performed for example in a known manner by upper clamping or snapping locks and by an additional screwing in the lower region.

A solution with a minimum number of simple components is provided when the driving and pulling elements of each side are composed of a driver pin and a pulling hook engaging with the driver pin. It is advantageous when each pulling hook is arranged turnably on the attachment and each driver pin is arranged outwardly and fixedly on the sliding shoe. The turnable support of both pulling hooks on the attachment provides the advantage that, during the operation of the harvester thresher without an attachment they do not remain on the cutting mechanism in a disturbing way. The pulling hooks must be preferably supported also at the outer side on the side walls of the attachment, so that they do extend in any case in the movement region of the components of the cutting mechanism, the reel or the attachment. Instead of special driver pins on the sliding shoes, also it is possible to engage by pulling hooks the ends of the reel rotary shaft supported in the sliding shoe.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
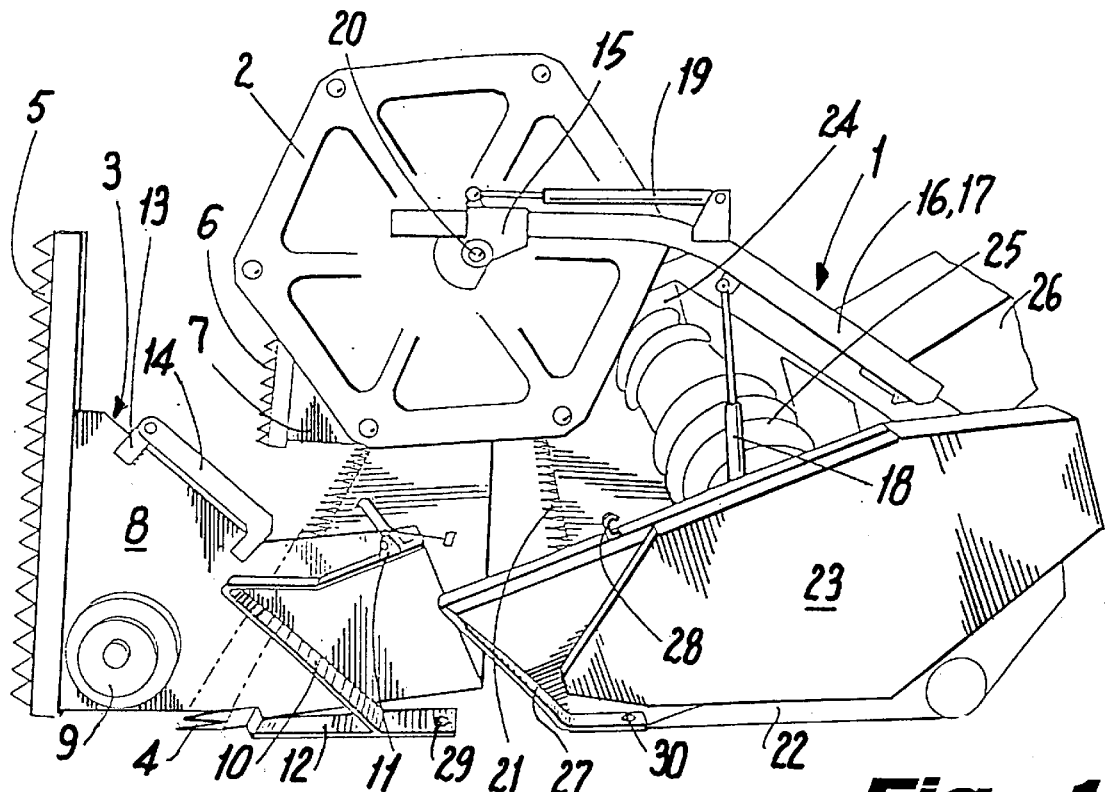
FIG. 1 is a view showing a cutting mechanism of a harvester thresher in accordance with the present invention and a coupled attachment in a side view and in such a position in which the driving and pulling elements are not bringable in engagement.

In order to simplify showing of a harvester thresher, only a cutting mechanism 1, a reel 2 and an attachment 3 of the harvester thresher are illustrated in the drawings. In the shown embodiment, the attachment 3 is designed for mowing and picking up of rape. In addition to a mowing bar 4 it is also provided with two lateral vertical cutting bars 5, 6.

The attachment 3 also has two side walls 7 and 8. Looking in direction onto the reel 2, a drive disk 9 is supported at the outer side on the right side wall 8. Shaped parts 10 are fixedly arranged on the outer sides of both side walls 7 and 8. They are bent from a flat material as approximately V-shaped parts and open in direction toward the cutting mechanism 1. The downwardly oriented leg of the shaped part 10 extends inclinedly, while the upper leg extends substantially horizontally, with a free end region angled upwardly and carrying a clamping closure 11. The inclinedly arranged leg carries a sliding ski 12 on its free end.

Both side walls 7 and 8 of the attachment 3 are provided in the upper region with correspondingly two bearing shackles 13 which extend opposite to the edge of the corresponding side wall 7, 8. A pulling hook 14 is turnably supported by a pin on a corresponding one of the bearing shackles and has a small offset outwardly with respect to the corresponding side wall 7 and 8. The reel 2 is rotatably drivingly supported at both sides in the sliding shoe 15. The drive is not shown for the sake of simplicity. The sliding shoes 15 are displaceably arranged on two reel supporting arms 16 and 17. The reel supporting arms 16 and 17 are turnable at the side facing away from the reel 2 around a joint horizontal axis by means of a hydraulic cylinder-piston unit 18. The sliding shoes 15 are also articulately connected to hydraulic cylinder-piston units 19, in order to adjust forwardly and rearwardly. At the outer side, a driver pin 20 is arranged on each sliding shoe 15. In connection with the pulling hook 14 it forms a drawing-in assisting means for the attachment 3, as will be explained hereinbelow.

The cutting mechanism 1 substantially includes a mowing bar 21, a mowing table 22 which forms a lower limit, two side walls 23, 24 which form side limits, and a drawing-in screw 25 which is rotatably driven and is followed by an inclined conveyor 26. V-like shaped parts 27 are arranged on the front regions of the side walls 23 and 24, and their contour corresponds to the shape parts 10. The leg which forms the front limit is offset rearwardly. A hook 28 is mounted on the upper edge of each side wall 23, 24 and cooperates with the associated clamping closure 11 of the attachment 13 in a proximal position. The sliding ski 12 at the end facing the cutting mechanism 1 is provided with a throughgoing opening 29, and the angled end of the leg of the V-like shaped part 27 of the cutting mechanism 1 is also provided a throughgoing opening 30. In the proximal position they are in alignment with one another.

Figure 2:
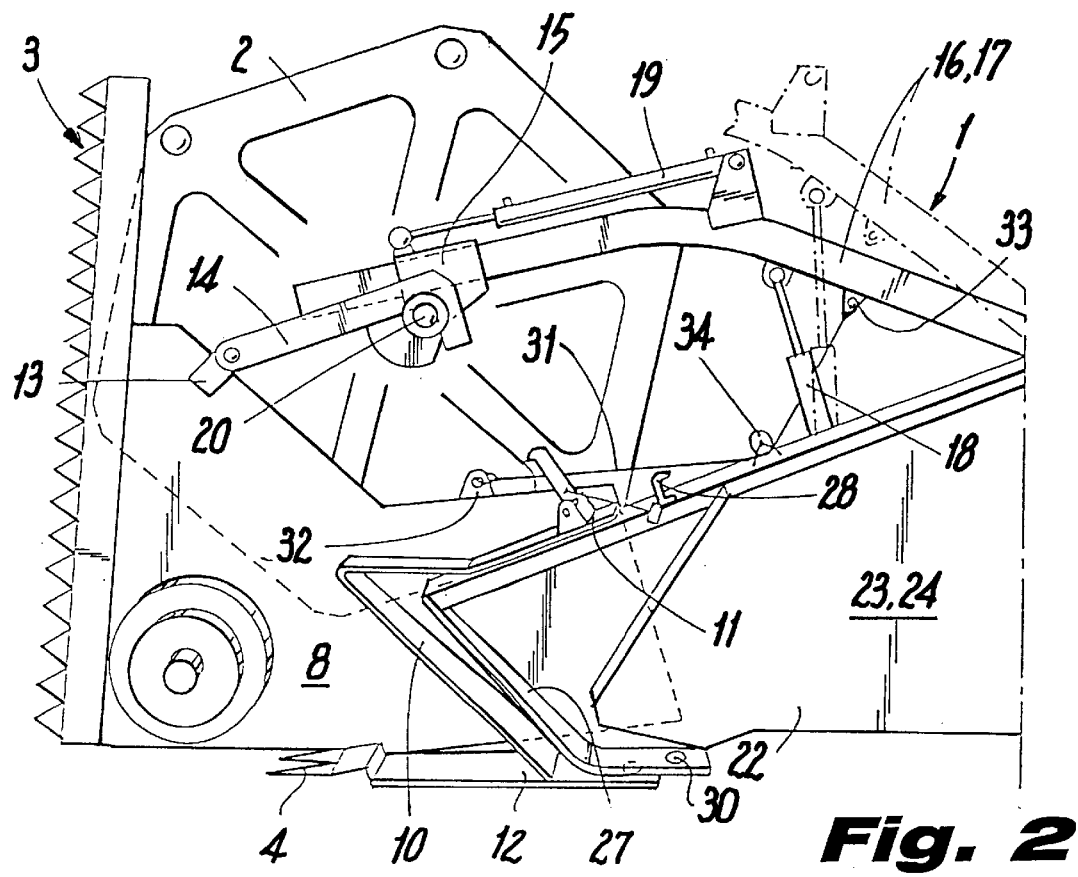
FIG. 2 is a view substantially corresponding to the view of FIG. 1, but showing the driving and pulling elements which are in engagement and in an inserted alternative solution.

For coupling the attachment 3 to the cutting mechanism 1 the driver drives the harvester thresher drives so that the position of the cutting mechanism 1 relative to the attachment 3 shown in FIG. 1 is provided. The front tips of the side walls 23, 24 slide during the further driving on the outer surfaces of the side walls 7, 8 of the attachment 3. The shaped parts 27 in connection with the side walls 7, 8 form an orientation or centering means. When the distance between the cutting mechanism 1 and the attachment 3 or between the mutually facing inclined legs of the shaped parts 10 and 27 reach a distance shown in FIG. 2, the pulling hooks 14 can be turned so that they engage the driver pins 20, and then the reel 2 is lowered to its lower position. It can be seen from FIG. 2 that by moving back the reel 2 by the hydraulic cylinder-piston unit 19, the attachment 3 is moved in direction toward the cutting mechanism 1 for such a length until the inclined leg of the V-like shaped parts 10 and 27 lie on one another. In this position, the clamping closure 11 which is not illustrated in detail can be brought in operative connection with the hook 28. Since moreover the throughgoing screws 29 and 30 are placed on one another, the sliding ski 12 and the angled end region of the shaped part 27 can be connected with one another by screws. For coupling the attachment 3 the harvester thresher driver needs no auxiliary people. The uncoupling of the attachment is performed in a reverse order.

In accordance with an alternative solution, instead of the pulling hook connection, the attachment 3 on its side walls 7 and 9 is connected with the reel supporting arms via a traction rope 31 correspondingly. For this purpose suspension shackles 32 and 33 for the rope ends are mounted on the side walls 7 and 8 and the reel supporting arms 16 and 17. By turning of the reel supporting arms 16, 17 by means of the hydraulic cylinder-piston unit 18 arranged at both sides, the attachment is pulled to its end position required for the coupling process. For providing the action of the pulling forces of the traction rope 31 on the attachment 3 in an optimal manner, it can be guided through rigid points, for example guiding rollers 34 on the walls 23, 24 of the mowing table.

It will be understood that each of the elements described above, or two or more together, may also find a useful application in other types of constructions differing from the types described above.

While the invention has been illustrated and described as embodied in the agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvester thresher, comprising a cutting mechanism having side walls; a reel having reel supporting arms; an exchangeable attachment which is releasably connected with said cutting mechanism and has side walls; sliding shoes in which said reel is rotatably supported and is synchronously forwardly and rearwardly displaceable on said reel supporting arms for adjusting said reel relative to said cutting mechanism; shaped parts arranged on said cutting mechanism and said attachment for moving said cutting mechanism and said attachment; driving and pulling elements arranged on said sliding shoes and on said attachment and connectable with one another at a predetermined distance between said cutting mechanism and said attachment so that by moving back said reel said attachment is movable to an end position.

2. A harvester thresher as defined in claim 1, wherein said driving and pulling elements are provided at each lateral side and each composed of a driver pin and a pulling hook engaging with said driver pin.

3. A harvester thresher as defined in claim 2, wherein each of said pulling hooks is arranged turnably on said attachment and each of said driver pins is arranged outwardly and fixedly on said sliding shoes.

4. A harvester thresher as defined in claim 2, wherein each of said pulling hooks is turnably supported on an upper edge of a respective one of said side walls of said attachment.

5. A harvester thresher, comprising a cutting mechanism having side walls; a reel having reel supporting arms; an exchangeable attachment which is releasably connected with said cutting mechanism and has side walls; shaped parts arranged on said cutting mechanism and on said attachment so as to move said cutting mechanism and said attachment, said reel with its ends being supported rotatably on said reel supporting arms which at one end are turnably connected with said cutting mechanism and supported longitudinally adjustably by hydraulic means; suspension shackles mounted on said reel supporting arms and on said side walls of said attachment; and traction ropes each having ends connectable with said suspension shackles correspondingly, so that by lifting said reel supporting arms by said hydraulic means said attachment is movable to a connectable end position.

6. A harvester thresher as defined in claim 5; and further comprising solid points over which said traction ropes are guided between ends, said solid points being formed as a guiding roller on said side walls of said cutting mechanism.

\* \* \* \* \*